US012603212B2

(12) United States Patent
Blow et al.

(10) Patent No.: US 12,603,212 B2
(45) Date of Patent: Apr. 14, 2026

(54) METHOD OF MAKING A SHIELDED INDUCTOR

(71) Applicant: Vishay Dale Electronics, LLC, Columbus, NE (US)

(72) Inventors: Darek Blow, Yankton, SD (US); Timothy M. Shafer, Yankton, SD (US); Chris Gubbels, Hartington, NE (US); Benjamin M. Hanson, Worthing, SD (US)

(73) Assignee: Vishay Dale Electronics, LLC, Columbus, NE (US)

(*) Notice: Subject to any disclaimer, the term of this patent is extended or adjusted under 35 U.S.C. 154(b) by 0 days.

(21) Appl. No.: 18/190,506

(22) Filed: Mar. 27, 2023

(65) Prior Publication Data

US 2023/0343502 A1 Oct. 26, 2023

Related U.S. Application Data

(60) Continuation of application No. 16/600,128, filed on Oct. 11, 2019, now Pat. No. 11,615,905, which is a (Continued)

(51) Int. Cl.
*H01F 7/06* (2006.01)
*H01F 17/04* (2006.01)
(Continued)

(52) U.S. Cl.
CPC ........... *H01F 17/04* (2013.01); *H01F 27/292* (2013.01); *H01F 27/36* (2013.01); *H01F 27/361* (2020.08); *H01F 27/363* (2020.08); *H01F 27/366* (2020.08); *H01F 41/02* (2013.01); *H01F 2017/048* (2013.01); *Y10T 428/32* (2015.01)

(58) Field of Classification Search
CPC ...... H01F 41/02; H01F 27/292; H01F 27/361; H01F 27/363; H01F 27/366; H01F 17/04
See application file for complete search history.

(56) References Cited

U.S. PATENT DOCUMENTS 3,255,512 A 6/1966 Lochner et al.
4,089,049 A 5/1978 Suzuki et al.
(Continued)

FOREIGN PATENT DOCUMENTS

CN 2807430 Y 8/2006
CN 2906854 Y 5/2007
(Continued)

OTHER PUBLICATIONS

"New IHLP-2525CZ-8A IHLP® Low-Profile, High-Current Inductor," Vishay New Product Info, Apr. 2014 (2pp).
(Continued)

*Primary Examiner* — Paul D Kim
(74) *Attorney, Agent, or Firm* — Volpe Koenig

(57) ABSTRACT

A shielded inductor and a method of making a shielded inductor are provided. The shielded inductor includes a core body surrounding a conductive coil, leads in electrical communication with the coil, and a shield covering at least parts of the outer surface of the core body. An insulating material may be provided between parts of the core body and parts of the shield. A method of making a shielded inductor is also provided.

17 Claims, 13 Drawing Sheets

Related U.S. Application Data division of application No. 15/134,078, filed on Apr. 20, 2016, now Pat. No. 10,446,309.

(51) Int. Cl.

| | |
|---|---|
| ***H01F 27/29*** | (2006.01) |
| ***H01F 27/36*** | (2006.01) |
| ***H01F 41/02*** | (2006.01) |

(56) References Cited

U.S. PATENT DOCUMENTS

| | | | |
|---|---|---|---|
| 4,319,216 | A | 3/1982 | Ikeda et al. |
| 4,427,961 | A * | 1/1984 | Suzuki .................. H01F 27/363 336/84 R |
| 4,538,132 | A | 8/1985 | Hiyama et al. |
| 4,725,804 | A | 2/1988 | Yarpezeshkan |
| 4,801,912 | A | 1/1989 | McElheny et al. |
| 5,095,296 | A | 3/1992 | Parker |
| 5,345,670 | A | 9/1994 | Pitzele et al. |
| 5,515,022 | A | 5/1996 | Tashiro et al. |
| 5,546,065 | A | 8/1996 | Vinciarelli et al. |
| 5,566,055 | A | 10/1996 | Salvi, Jr. |
| 5,761,053 | A | 6/1998 | King et al. |
| 5,763,824 | A | 6/1998 | King et al. |
| 6,114,932 | A | 9/2000 | Wester et al. |
| 6,137,390 | A | 10/2000 | Tung et al. |
| 6,166,918 | A | 12/2000 | Olofsson et al. |
| 6,178,318 | B1 | 1/2001 | Holmberg et al. |
| 6,198,375 | B1 | 3/2001 | Shafer |
| 6,204,744 | B1 | 3/2001 | Shafer et al. |
| 6,229,124 | B1 | 5/2001 | Trucco |
| 6,362,986 | B1 | 3/2002 | Schultz et al. |
| 6,392,525 | B1 | 5/2002 | Kato et al. |
| 6,449,829 | B1 | 9/2002 | Shafer |
| 6,460,244 | B1 | 10/2002 | Shafer et al. |
| 6,674,652 | B2 | 1/2004 | Forte et al. |
| 6,717,500 | B2 | 4/2004 | Girbachi et al. |
| 6,744,347 | B2 | 6/2004 | Masuda et al. |
| 6,847,280 | B2 | 1/2005 | Kung |
| 6,946,944 | B2 | 9/2005 | Shafer et al. |
| 6,967,553 | B2 | 11/2005 | Jitaru |
| 7,034,645 | B2 | 4/2006 | Shafer et al. |
| 7,049,682 | B1 | 5/2006 | Mathews et al. |
| 7,076,230 | B2 | 7/2006 | Nakatsuji et al. |
| 7,221,249 | B2 | 5/2007 | Shafer et al. |
| 7,263,761 | B1 | 9/2007 | Shafer et al. |
| 7,345,562 | B2 | 3/2008 | Shafer et al. |
| 7,352,269 | B2 | 4/2008 | Li et al. |
| 7,381,906 | B2 | 6/2008 | Holmberg |
| 7,463,496 | B2 | 12/2008 | Robinson et al. |
| 7,491,901 | B2 | 2/2009 | Lu |
| 7,525,406 | B1 | 4/2009 | Cheng |
| 7,567,163 | B2 | 7/2009 | Dadafshar et al. |
| 7,651,337 | B2 | 1/2010 | McNamara |
| 7,713,783 | B2 | 5/2010 | Kitamura et al. |
| 7,808,358 | B2 | 10/2010 | Nakamura et al. |
| 7,864,015 | B2 | 1/2011 | Hansen et al. |
| 7,921,546 | B2 | 4/2011 | Shafer et al. |
| 7,936,244 | B2 | 5/2011 | Hansen |
| 7,986,207 | B2 | 7/2011 | Shafer et al. |
| 8,063,227 | B2 | 11/2011 | Tapper et al. |
| 8,063,727 | B2 | 11/2011 | Emmons et al. |
| 8,289,121 | B2 | 10/2012 | Yan et al. |
| 8,471,668 | B2 | 6/2013 | Hsieh et al. |
| 8,629,748 | B2 | 1/2014 | Nakada et al. |
| 9,136,050 | B2 | 9/2015 | Hsieh et al. |
| 9,673,150 | B2 | 6/2017 | Gong et al. |
| 10,446,309 | B2 | 10/2019 | Blow et al. |
| 2003/0197585 | A1 | 10/2003 | Chandrasekaran et al. |
| 2003/0222749 | A1 | 12/2003 | Kung |
| 2004/0222478 | A1 | 11/2004 | Zhang et al. |
| 2005/0061528 | A1 | 3/2005 | Bayar et al. |
| 2005/0073382 | A1 | 4/2005 | Kung |
| 2007/0052510 | A1 | 3/2007 | Saegusa et al. |
| 2007/0252669 | A1 | 11/2007 | Hansen et al. |
| 2007/0285200 | A1 | 12/2007 | Hsieh |
| 2007/0294880 | A1 | 12/2007 | Hsieh |
| 2008/0029854 | A1 | 2/2008 | Hung et al. |
| 2008/0136576 | A1 | 6/2008 | Emmons et al. |
| 2009/0289754 | A1 | 11/2009 | Shpiro et al. |
| 2010/0007451 | A1 | 1/2010 | Yan et al. |
| 2010/0308950 | A1* | 12/2010 | Hsieh ........................ H01F 3/10 336/221 |
| 2012/0216392 | A1 | 8/2012 | Fan |
| 2012/0242447 | A1 | 9/2012 | Ichikawa |
| 2014/0210584 | A1 | 7/2014 | Blow |
| 2015/0221431 | A1 | 8/2015 | Wu Li |
| 2016/0227679 | A1* | 8/2016 | English ................ H05K 9/0024 |
| 2017/0309394 | A1 | 10/2017 | Blow et al. |
| 2017/0323718 | A1 | 11/2017 | Foley |
| 2018/0025833 | A1 | 1/2018 | Kainaga et al. |
| 2018/0132390 | A1 | 5/2018 | Jeong et al. |
| 2019/0318868 | A1 | 10/2019 | Chung et al. |

FOREIGN PATENT DOCUMENTS

| | | | | |
|---|---|---|---|---|
| CN | 200944728 | Y | 9/2007 | |
| CN | 102479767 | A | 5/2012 | |
| CN | 202948830 | A * | 5/2013 | |
| CN | 202948830 | U | 5/2013 | |
| CN | 103680892 | A | 3/2014 | |
| CN | 203774044 | U | 8/2014 | |
| CN | 204168705 | U | 2/2015 | |
| CN | 204668122 | U | 9/2015 | |
| CN | 206481556 | U | 9/2017 | |
| CN | 107791641 | A | 3/2018 | |
| CN | 107791641 | B | 1/2020 | |
| EP | 1455564 | A1 | 9/2004 | |
| EP | 1502930 | A1 | 2/2005 | |
| JP | S4721490 | Y1 | 7/1972 | |
| JP | S60106112 | A | 6/1985 | |
| JP | H01310519 | A | 12/1989 | |
| JP | H0311 | B2 | 1/1991 | |
| JP | H06260352 | A | 9/1994 | |
| JP | H09121093 | A | 5/1997 | |
| JP | 3201958 | B2 | 8/2001 | |
| JP | 2004022814 | A | 1/2004 | |
| JP | 3098537 | U | 3/2004 | |
| JP | 2005005624 | A | 1/2005 | |
| JP | 2006165465 | A | 6/2006 | |
| JP | 4010624 | B2 | 11/2007 | |
| JP | 2009099766 | A | 5/2009 | |
| JP | 2011077542 | A | 4/2011 | |
| JP | 2015106622 | A * | 6/2015 | ......... H01F 17/0013 |
| KR | 20050007101 | A | 1/2005 | |
| TW | 562223 | U | 11/2003 | |
| TW | 279001 | U | 10/2005 | |
| TW | 299347 | U | 10/2006 | |
| TW | M441316 | U | 11/2012 | |
| WO | 2014184105 | A1 | 11/2014 | |

OTHER PUBLICATIONS

"New IHLP-8787MZ-51 Low-Profile, High-Current Inductor," Vishay New Product Info, Jan. 2014 (2pp).

"New IHTH-0750IZ-5A and IHTH-1125KZ-5A High-Current, High-Temperature Through-Hole Inductors," May 2013 (2pp).

"New Vishay Intertechnology Composite-Coupled Inductors Built on IHLP® Technology for Sepic DC/DC Converters and Common Mode Applications," Feb. 5, 2014 (1p). https://www.vishay.com/company/press/releases/2014/140205inductors/.

"New Vishay Intertechnology IHLP® Inductors in 2020 Case Size Offer High-Temperature Operation to +155 °C," Jan. 15, 2015 (2pp). https://www.vishay.com/company/press/releases/2015/150115IHLP-2020CZ/.

"Vishay Dale ISC-1008—Wirewound, Surface Mount, Shielded Inductor." Data sheet, Document No. 34173, Aug. 10, 2006 (2pp).

"Vishay IHLE-4040DC-5A Low-Profile, High-Current Inductor Lowers Costs and Saves Space With Integrated E-Shield," Vishay New Product Info, Dec. 2014 (2pp).

(56) References Cited

OTHER PUBLICATIONS

"Vishay Intertechnology Low-Profile, High-Current Inductor Lowers Costs and Saves Space With Integrated E-Shield," Dec. 16, 2014 (1p). https://www.vishay.com/company/press/releases/2014/141216Inductors/?
"Vishay's New Surface-Mount, Wirewound Inductor With Shielded Construction Offers Wide Inductance Range of 1.0 μH to 1000 μH," Jul. 20, 2005 (1pp). https://www.vishay.com/company/press/releases/2005/050720inductors/.
Cooper Bussman Coil Tronics (TM), CPL Series Multi-Phase Power Inductors, product brochure (2006) (5 pp).
Czogalla, Jens et al., "Automotive Application of Multi-Phase Coupled-Inductor DC-DC Converter," IAS (2003) (6 pp).
Li, Jieli et al., "Coupled-Inductor Design Optimization for Fast-Response Low-Voltage DC-DC Converters," APEC 2002 (7 pp).
Li, Jieli et al., "Using Coupled Inductors to Enhance Transient Performance of Multi-Phase Buck Converters," power point presentation, Volterra, 2004 Intel Technology Symposium (25 pp).
Nan, Xi et al., "An Improved Calculation of Proximity-Effect Loss in High-Frequency Windings of Round Conductors," PESC 2003 (8 pp).
Politecnica de Madrid, E.T.S.I. Industriales, Division de Ingenieria Electronica, C/Jose Gutierrez Abascal, 2.28006 Madrid, Spain, 2003, pp. 1143-1149.
SMT Power Inductors, Power Beads—PA131xNL Series Coupled Inductors, Pulse, catalog pages, pulseeng. comp. P636.A (Nov. 2005) (2 pp).
Wong, Pit-Leong et al., "Investigating Coupling Inductors in the Interleaving QSW VRM," Center for Power Electronics Systems, The Bradley Dept. of Electrical and Computer Engineering, Virginia Polytechnic Institute and State University, Blacksburg, VA 24061 USA (2000) (6 pp).
"SLM534214 Series" ITG Electronics, Apr. 20, 2016 (3 pp).
"SLM534214 Series" ITG Electronics, Feb. 18, 2013 (3 pp).
"SLM534214 Series" ITG Electronics, Jul. 17, 2014 (3 pp).
"TX5001 PoE Forward Transformer" Tesla Magnetics Inc., Form 202—Rev Nov. 15, 2014 (1pp).
"TX4017 Flyback Transformer" Tesla Magnetics Inc., Form 202—Rev Nov. 15, 2014 (1pp).
"TX4021 Flyback Transformer" Tesla Magnetics Inc., Form 202—Rev Nov. 15, 2014 (1pp).
"TX5000 Current Sense Transformer" Tesla Magnetics Inc., Last accessed Jun. 27, 2024 (1pp).
"EFD20 Transformer TX3003" Tesla Magnetics Inc., Last accessed Jun. 27, 2024 (1pp).
"PoE Transformer TX4001" Tesla Magnetics Inc., Last accessed Jun. 27, 2024 (1pp).
"30W Flyback PeE Plus Transformers" Tesla Magnetics Inc., Form 202—Rev Nov. 15, 2014 (1pp).

* cited by examiner

METHOD OF MAKING A SHIELDED INDUCTOR

CROSS REFERENCE TO RELATED APPLICATION(S)

This application is a continuation of U.S. patent application Ser. No. 16/600,128, filed Oct. 11, 2019, U.S. Pat. No. 11,615,905, which is a division of U.S. patent application Ser. No. 15/134,078, filed Apr. 20, 2016, which issued as U.S. Pat. No. 10,446,309 on Oct. 15, 2019, the entirety of all of which are incorporated by reference as if fully set forth herein.

FIELD OF INVENTION

This application relates to the field of electronic components, and more specifically, shielded inductors and methods for making shielded inductors.

BACKGROUND

Inductors are, generally, passive two-terminal electrical components which resist changes in electric current passing through them. An inductor includes a conductor, such as a wire, wound into a coil. When a current flows through the coil, energy is stored temporarily in a magnetic field in the coil. When the current flowing through an inductor changes, the time-varying magnetic field induces a voltage in the conductor, according to Faraday's law of electromagnetic induction. As a result of operating based on magnetic fields, inductors are capable of producing electric and magnetic fields which may interfere with, disturb and/or decrease the performance of other electronic components the inductor. In addition, other electric fields, magnetic fields or electrostatic charges from electrical components on a circuit board can interfere with, disturb and/or decrease the performance of the inductor.

Some known inductors are generally formed having a core body of magnetic material, with a conductor positioned internally, at times with the conductor formed as a coil. Attempts to provide magnetic shielding for such inductors have, in some instances, been cumbersome, inefficient, difficult to manufacture, or ineffective. For example, large electromagnetic shielding has been used to cover a large target area to be shielded on a circuit board in order to help protect sensitive components from electromagnetic radiation produced by inductors. This proves both cumbersome and inefficient. Such shielding takes up important space in an electronic device to shield the inductor, and reduces the electromagnetic radiation at the source.

Thus, an inductor shield would be useful in blocking, decreasing or limiting interference from electromagnetic and other electrical fields.

There remains the need, then, for an efficient and effective shield for an inductor that shields from electromagnetic and other electrical fields, with the shield being easy to manufacture.

There further remains the need for an efficient and effective shield for an inductor with a relatively proportional size as compared to the body of the inductor.

There further remains the need for an efficient and effective shield for an inductor that does not take up space within the inductor body.

SUMMARY

Inductors and methods of manufacturing inductors are described herein.

In an aspect of the present invention, a shielded inductor is provided having a core body and a shield covering at least a part of the surface of the core body. An optional insulating material is provided between at least a part of the core body and at least a part of the shield.

In another aspect of the present invention, a shielded inductor is provided. The shielded inductor includes a core body surrounding a conductive coil, leads in electrical communication with the coil, and a shield covering at least a portion of an outer surface of the core body. The shield may be generally configured as having a complementary shape in order to fit to the shape of the core body. The shield provides protection from electromagnetic fields by reducing the exposed portions of the core body.

The shield may include a cover portion that generally covers at least portions of exposed outer surfaces of the core body. The cover portion may include various extensions of various sizes that extend along portions of the inductor core body to both provide shielding and/or to secure the shield to the inductor core body. The extensions may include lip portions, side cover portions, and/or tab portions.

An inductor according to the present invention may include an insulating material positioned between the core body and the shield.

In another aspect of the present invention, a method of manufacturing a shielded inductor according to the invention is also provided. The method for producing a shielded inductor includes pressure molding magnetic material around a wire coil to form a core body and to bond the wound coils to each other to form a coil, producing the shield by stamping and forming sheets into the shape that covers the molded core body, placing the shield on the pressed powder inductor in order to cover the exposed edges of the core body, and forming tabs around the side of the inductor opposite the shield to fasten the shield to the core body. The method may include applying an insulating material applied between the core body and the shield. The method may include forming the core body with zero, two or four pockets.

BRIEF DESCRIPTION OF THE DRAWINGS

A more detailed understanding may be had from the following description, given by way of example in conjunction with the accompanying drawings wherein.

DETAILED DESCRIPTION

Figure 1A:
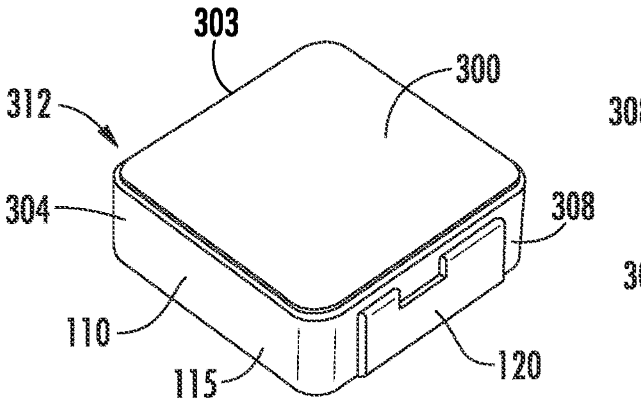
FIGS. 1A through 1I show example inductors that may be used with one or more shields according to the present invention.
Figure 1B:
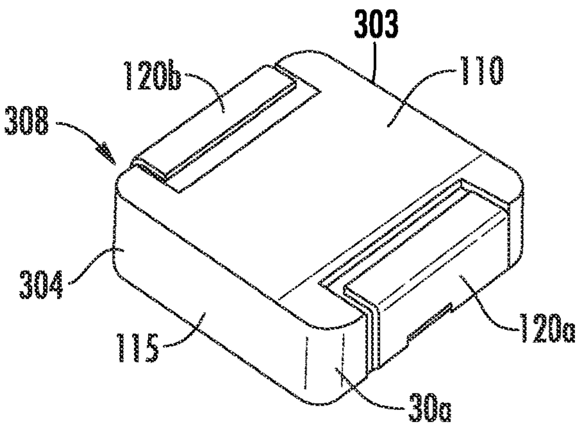
Figure 1C:
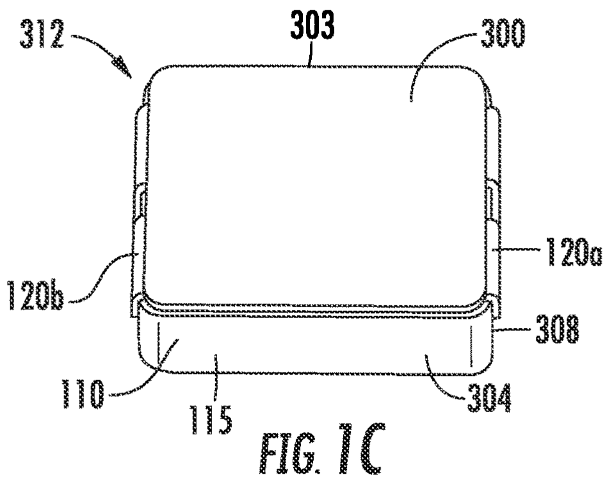
Figure 1D:
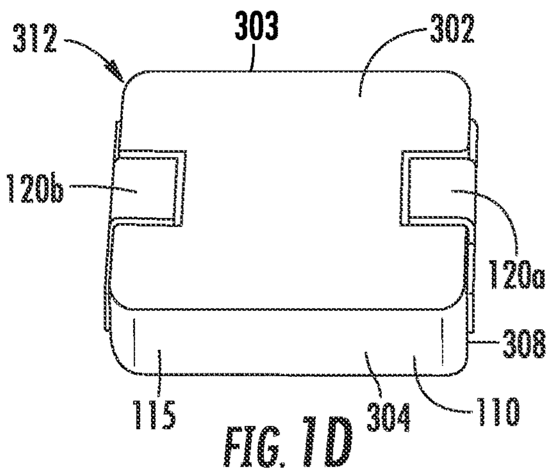
Figure 1E:
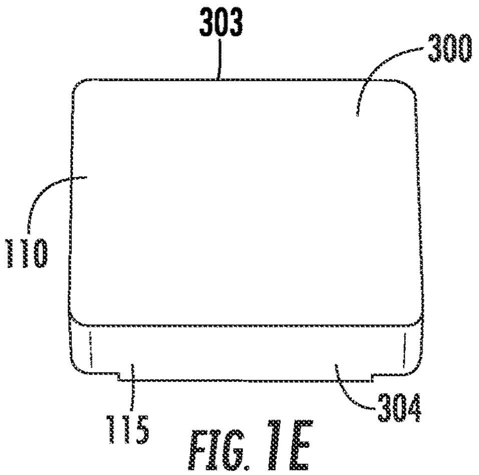
Figure 1F:
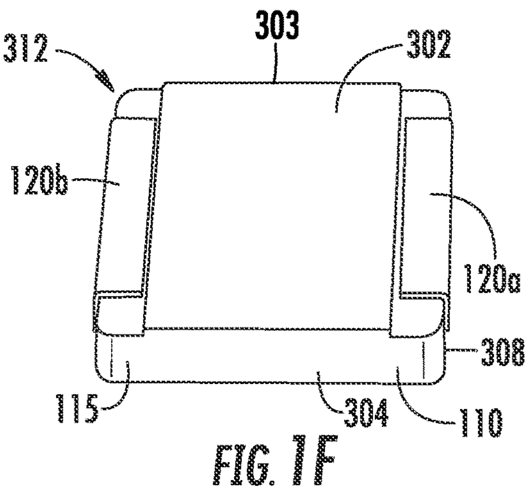
Figure 1G:
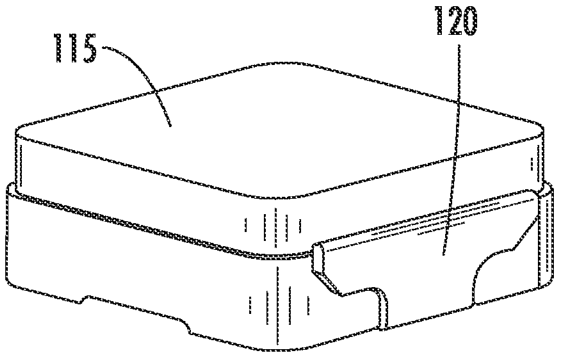
Figure 1H:
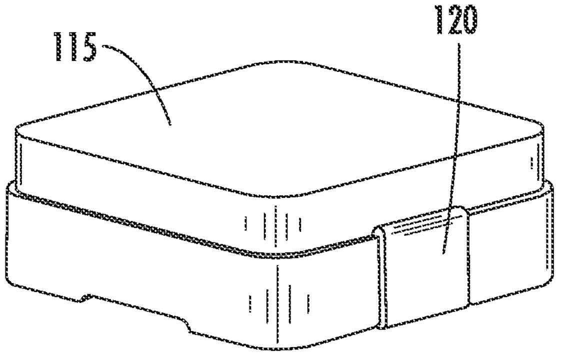
Figure 1I:
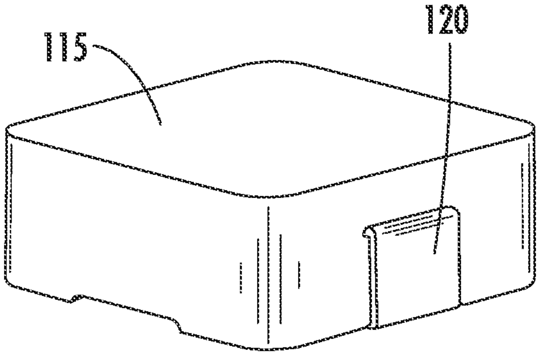

Certain terminology is used in the following description for convenience only and is not limiting. The words “right,” “left,” “top,” and “bottom” designate directions in the drawings to which reference is made. The words “a” and “one,” as used in the claims and in the corresponding portions of the specification, are defined as including one or more of the referenced item unless specifically stated otherwise. This terminology includes the words above specifically mentioned, derivatives thereof, and words of similar import. The phrase “at least one” followed by a list of two or more items, such as “A, B, or C,” means any individual one of A, B or C as well as any combination thereof.

FIGS. 1A through 1I illustrate several example inductors that could form the basis of shielded inductors according to the present invention. Each of the example inductors includes a core 110 that includes a core body 115, an internal inductive coil, and external leads 120 in electrical communication with the internal inductive coil.

Figure 10A:
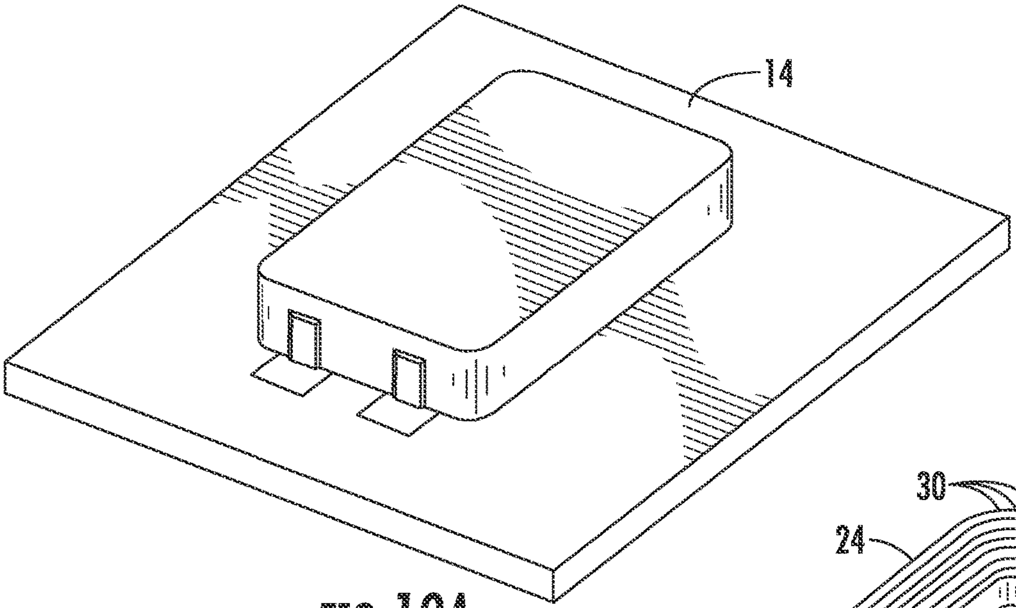
FIGS. 10A and 10B are example known inductors having constructions that may be used to form the basis of a shielded inductor according to the present invention.
Figure 10B:
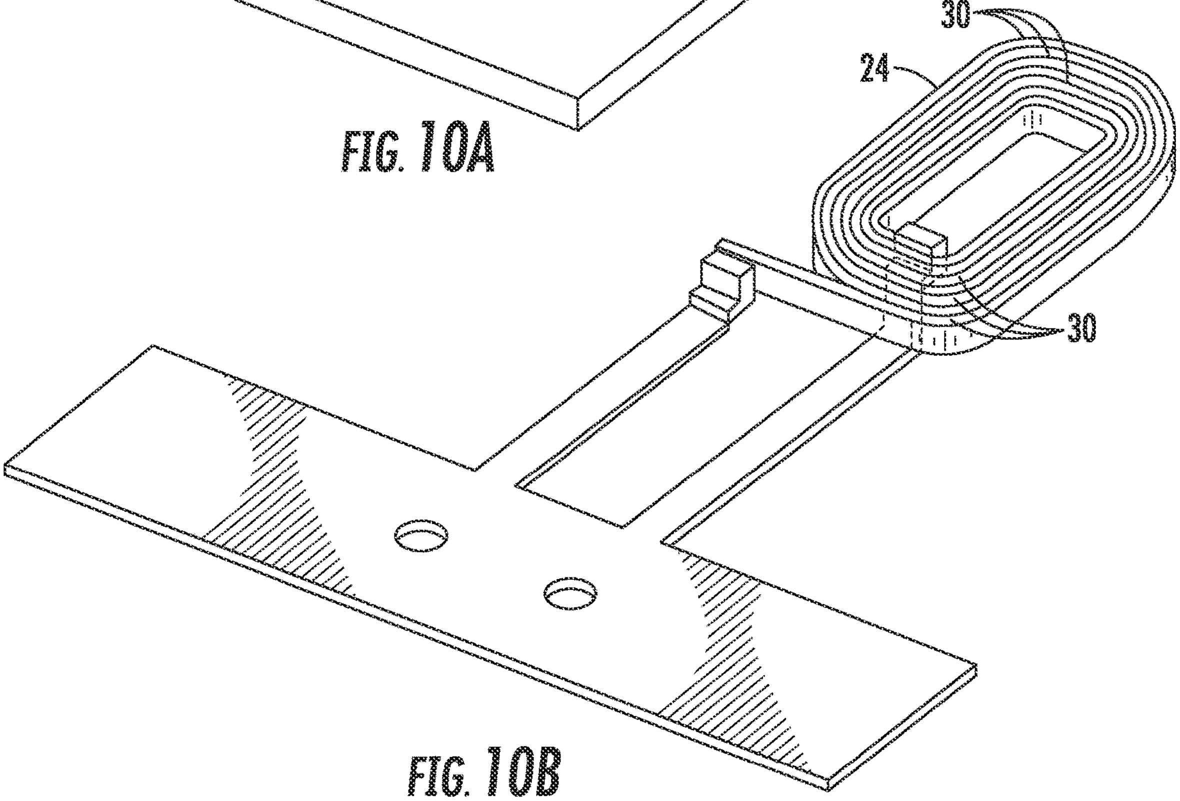

A type of inductor that may be used or may provide a basis for a shielded inductor according to the present invention is a high current, low profile inductor as shown and described in U.S. Pat. No. 6,204,744, which patent is incorporated in its entirety by reference as if fully set forth herein, or a variation thereof. Generally, as shown in FIGS. 10A and 10B, a high current, low profile inductor includes a core body 14 and a wire coil including an inner coil end and an outer coil end within the core body 14, the wire coil 24 including a plurality of turns 30 within the core body 14. A magnetic material, for example, a first powdered iron, a second powdered iron, a filler, a resin, and a lubricant, completely surrounds the wire coil to form the core body 14. First and second leads connected to the inner coil end and the outer coil end respectively extend through the magnetic material core to the exterior of inductor.

Several inductors and/or inductor cores that may be used with inductor shields according to the present invention are shown in FIGS. 1A through 1I. Each of the inductors includes a core 110 including a core body 115. In the orientations shown in FIGS. 1A through 1I, each core body 115 includes a top surface 300 and an opposite bottom surface 302, a front side 304 and an opposite back side 303 (the back side 303 may be a mirror image of the front side 304), a right side 308, and a left side 312 (the left side 312 may be a mirror images of the right side 308). Terminals are included that are in electrical communication with an internal inductive element such as a coil or wire, and are generally designated as 120. The leads 120 include a first terminal 120*a* adjacent the right side 308, and a second terminal 120*b* adjacent the left side 312. The terminals 120*a*, 120*b* may be oriented based on an inductor's use or application, and may take different shapes and arrangements as shown in the Figures, with wider and narrow portions of the leads.

Although shown on opposite sides of the core body of the inductor, it is appreciated that the leads 120 could be positioned on the same side of the core body. Further, a plurality of leads may be provided extending along various surfaces of the core body. In such instances, the shield may either cover parts of such leads, or may be sized and arranged so that the leads are not covered. Such arrangements are discussed in further detail herein.

As shown in FIGS. 2A-2D, a shield 500 for blocking, limiting and/or decreasing electromagnetic and/or electrostatic interference, or interference from other electrical fields, according to an embodiment of the present invention is shown. The shield 500 includes a cover portion 460 with cut-out portions 510, 520, 530, 540 at each of the corners or edges of the cover portion 460.

The shield 500 is preferably produced by stamping and forming a thin copper sheet into a shape that covers the core body 115 of the inductor. The shield 500 may also be produced by drawing. Conductive materials such as steel or aluminum may also be used for the shield 500. Combinations of various conductive materials may also be used. When formed comprising a conductive material, the shield may be referred to as a “conductive shield.”

As shown in various views in, the shield 500 preferably comprises side covers generally designated as 420, and shown as a first side cover 420*a* and a second side cover 420*b*, that extend from the cover portion 460. The first side cover 420*a* and a second side cover 420*b* are oriented, when positioned on an inductor core body, on opposite front 304 and back 303 sides of core body 115, that is, the sides of the core body 115 that are not occupied by lead portions 120*a*, 120*b*. In an embodiment, the side covers 420 extend along a width that is less than the full width of an inductor core body to which the shield 500 will be secured, with the outer edges of the side covers 420 stopping at the beginnings of neighboring cut-out edges 510, 520, 530, 540 of the cover portion 460. In an embodiment, the side covers 420 may also include a step 205 from a largest diameter portion of the side covers 420 to a smaller diameter portion of the side covers 420 adjacent the top of the side covers 420.

The shield 500 may further include lip portions generally designated as 440 (separately designated as 440*a*, 440*b*). The lip portions 440*a*, 440*b* are positioned on opposite sides of core body 115 from one another. Preferably, the lip portions 440*a*, 440*b* are positioned on the sides of core body 115 that are also occupied by the leads 120. The lip portions 440*a*, 440*b* extend partially along the sides of the core body 115, preferably less than halfway along the sides of core body 115, or they may extend along a height of the sides whereby they do not interfere with the parts of the leads 120 that extend from the core body 115. In an embodiment, the lip portions 440 extend along a width that is less than the full width of an inductor to which the shield 500 will be secured, with the outer edges of the lip portions 440 stopping at the beginnings of the cut-out edges 510, 520, 530, 540 of the cover portion 460.

The shield 500 also preferably comprises one or more tabs generally designated as 430 (separately designated as 430*a*, 430*b*) protruding from each side cover 420, and preferably from a central portion of each side cover 420. Each tab 430 preferably has a generally L-shape when the shield 500 is secured to a core body of an inductor, with a first portion extending along the side of the core body 115 toward the bottom surface 302, and a second portion bent under and extending beneath the core body 115, and along a portion of the bottom surface 302.

The tabs 430 may be used, by way of example, to provide for grounding the shield. However, it is appreciated that a shielded inductor according to the present invention could also be used without grounding. In addition, the tabs 430 can be positioned so that they are bent away from the core body, providing extended legs pointing away from the core body.

As shown in FIGS. 2A-2D, the shield 500 includes a cover portion 460 that is positioned against and generally covers a top surface 300 of the core body 115. In a preferred embodiment, the cover portion 460 generally covers the entirety or most of the top surface 300 of the core body 115, although it is appreciated that the cover portion 460 may cover all, almost all, or only a part of the top surface 300 of the core body 115. Further, it is further appreciated that the cover portion 460 could extend beyond the edges of the top surface 300 of the core body, and be longer, wider, or both longer and wider, than the area of the top surface 300 of the core body. The cover portion 460 is formed as a thin wall, covering an area of similar dimensions to the top surface 300 of the core body 115, and is generally shaped as a rectangle having clipped, cut-out, angled or beveled edges 510, 520, 530, 540, so that the extension portions 440, 420, 430 are permitted to fold or bend without interference during a manufacturing or an assembly process.

Figure 2A:
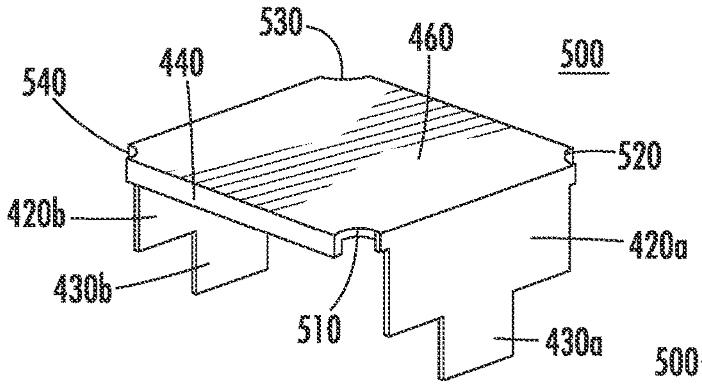
FIG. 2A shows a top perspective view of an inductor shield according to an embodiment of the present invention.
Figure 2B:
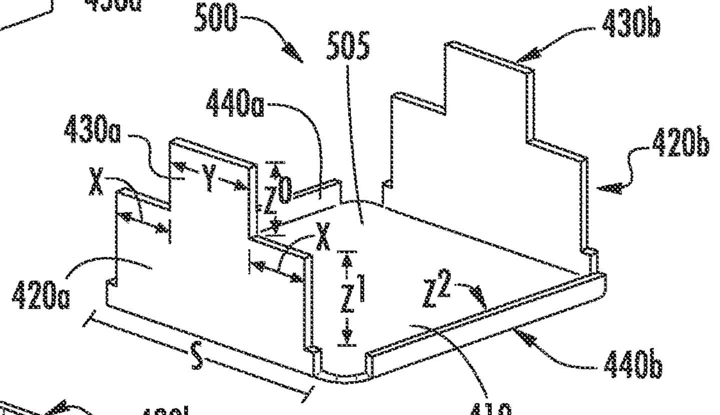
FIG. 2B shows a bottom perspective view of the inductor shield of FIG. 2A.

FIG. 2B is an illustration of an example shield 500 according to the present invention, having the same configuration as the shield of FIG. 2A, before an optional insulation layer 410 is applied to its inner surface. The shield 500 includes a cover portion 460 to be positioned covering the top or exposed upper portion of an inductor as oriented in the Figures. The shield has a first side 420*a* and a second side cover 420*b*. FIG. 2B illustrates the relative dimensions of parts of the shield 500. Portions of the shield 500 may be shaped to complement the shape of the underlying inductor core body that the shield is shielding. The shield 500 may be formed from a single piece of copper sheeting, for example. Those of skill in the art will appreciate other materials that may be used.

As shown in FIG. 2B, the side covers 420*a*, 420*b* have an approximate width S that extends between neighboring cut-out edges 510, 520, 530, 540 of the cover portion 460. The width S is less than the width of the underlying inductor core body that the shield 500 is shielding. The side cover 420*a* has a height Z1 that is at least partially the height of the underlying inductor core body. The tabs 430*a*, 430*b* have a height Z0 that permits the tabs 430*a*, 430*b* to extent at least partially along the height of the underlying inductor core body, and to be at least partially bent under and extend along the bottom surface 302 of the underlying inductor core body. The tabs 430*a*, 430*b* have a width Y that is preferably less than the width S of the side covers 420.

Figure 2C:
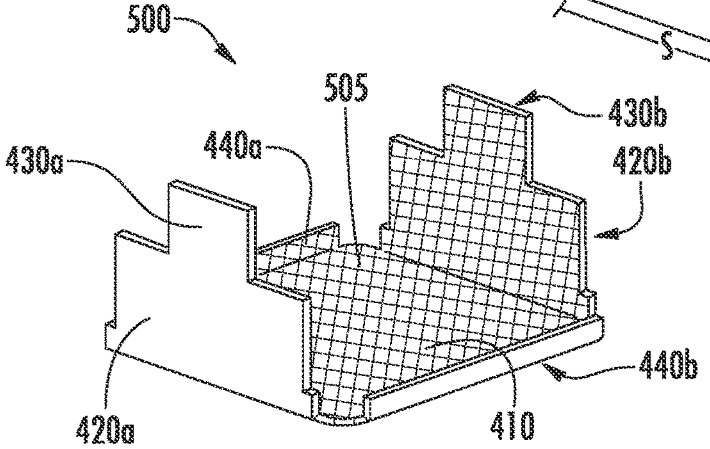
FIG. 2C shows the inductor shield of FIG. 2B with an insulation layer on an inner surface of the shield.

As shown in FIG. 2B, the width of parts of the side cover 420*a* on opposite sides of the tab 430*a* have a width designated as X and X'. As shown in FIG. 2C, tab 430*a* is shown approximately centered, and the width X and X' are approximately equal on either side of the tab 430*a*. However, the tabs 420 may extend at various positions along the width of the side covers 420, including being biased more toward one side or the other. Thus, X and X' may not be equal in certain arrangements.

The lip portions 440*a*, 440*b* may have an approximate width W' that extends between neighboring cut-out edges 510, 520, 530, 540 of the cover 460. The width W' is less than the width of the underlying inductor core body that the shield is shielding. As shown in FIG. 2B, lip portions 440*a*, 440*b* may have a height Z2 that is less than the heights Z1 or Z0 of the side cover portions 420, in an embodiment.

An optional insulation layer 410 is provided between at least portions of the core body 115 and at least portions of the shield 500. FIG. 2C is an illustration of the shield of FIG. 2B including an insulation layer or coating on an inner surface 505 of the shield 500. The insulation layer 410 may comprise, for example, insulating materials such as KAPTON™ or TEFLON™. Other insulating materials such as insulating tape, NOMEX™, silicone, or other insulating materials may be used as known to those in the art.

The insulating layer 410 acts to electrically isolate the shield 500 from the core body 115 of the inductor. The insulating layer 410 covers at least a portion of the inner surface 505 of the shield, and preferably covers the entirety of the inner surface 505 of the shield. It is appreciated that the insulating layer 410 can be formed of various thicknesses depending on the arrangement, shape and/or material of the underlying core body and the use and/or performance of the shielded inductor.

Figure 2D:
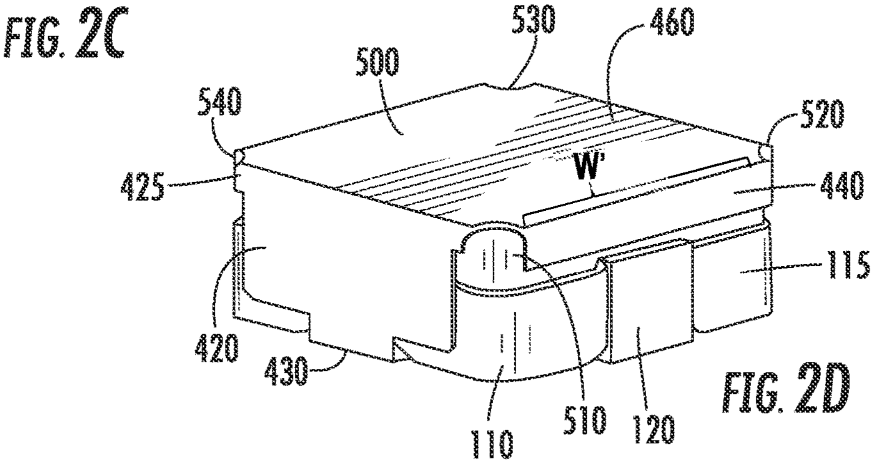
FIG. 2D shows the inductor shield of FIG. 2B or 2C positioned on the core body of an inductor to form a shielded inductor.

While the insulation layer 410 is shown in FIG. 2C applied to an inner surface 505 of the shield 500, the insulation layer 410 may be provided in other ways to position the insulation layer 410 between the core body 115 and the shield 500. For example, at least a part of the core body 115 can be coated with an insulation layer 410 formed from an insulating material, as shown in FIG. 2I. In FIG. 2I, the insulation layer 410 is provided along a top surface 300 of the core body 115, as well as along parts of the sides of the core body adjacent the top surface 300. The insulation layer 410 can be provided along selected parts of the core body 115 of an inductor according to the present invention to meet the specifications and/or requirements for the use or capabilities of a particular shielded inductor.

The shield is placed on top of a pressed powder inductor core body 115 in order to cover parts of the exposed top, edges, and sides of the inductor with a shield that may be formed from copper, and with the tabs 430 formed around and under the inductor to fasten the shield to the inductor. In FIG. 2D, the shield 500 is positioned with the cover portion 460 adjacent what is referred to as the top surface 300 of the core body 115. The shield 500 forms a cover for the top surface 300 of the core body 115, and has at least one or more extensions (for example, the described lip portions 440, side covers 420, and/or tab portions 430) that extend along one or more of the front, back, and/or side surfaces of the core body 115. The shield can either be coated with an insulation layer 410 as in FIG. 2C, or uncoated as in FIG. 2B.

Once assembled, in an embodiment of the invention as shown in FIG. 2D, the shield 500 covers portions of the core body 115 in the following manner: (i) cover portion 460 covers most of the top surface 300 that was previously an exposed surface portion of the core body 115; (ii) the first and second side covers 420*a*, 420*b* covering portions of the non-lead sides 304, 303 of the core body 115, (iii) the lip portions 440 extending partially down opposite sides 308, 312 of core body 115; the tabs 430 extending from the side covers 420 and wrapping under the core body 115 to assist in holding the shield 500 in place or otherwise secure the shield 500 on the core body 115.

Figure 2E:
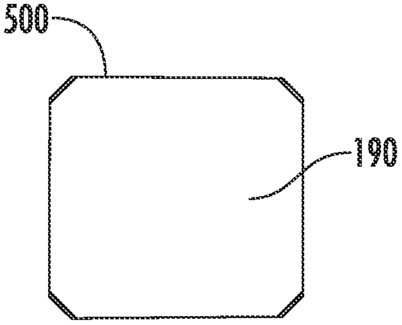
FIG. 2E shows a top plan view of the shielded inductor of FIG. 2D.

FIG. 2E is an illustration of a top view of the example shielded inductor of FIG. 2D, with the shield 500 in place. The shield 500 is depicted as having a shape that is at least in part essentially matching, or complementary to, the shape of the top or upper surface 300 of the core body 115. That is, the shield 500 is sized and shaped at least in part to fit closely against outer surfaces of the core body 115, forming the shielded inductor of the invention. When the shield 500 is initially formed as a flat sheet, it is shaped and sized so that when bent around a core body, it provides a uniform and essentially snug fit. As depicted, the cover portion 460 of the shield 500 is generally rectangular, and may be square, with cut-out or notched edges 510, 520, 530, 540.

Figure 2F:
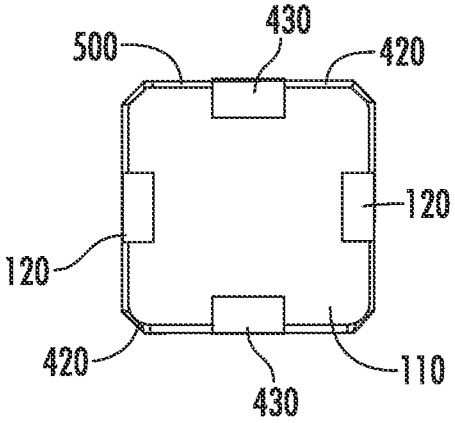
FIG. 2F shows a bottom plan view of the shielded inductor of FIGS. 2D and 2E.

FIG. 2F is an illustration of a bottom view of the example inductor 100. As shown in FIG. 2F, the bottom of the core body 115 is generally exposed, or uncovered. The leads 120 are bent underneath the core body 115 on opposite sides of the inductor 100, and on the same sides as the lip portions 440 of the shield 500. The tab portions 430 extending from the side covers 420 are bent underneath the core body 115 and are positioned against the bottom surface 302.

While embodiments of a shielded inductor are shown and described with tab portions bent under the inductor core body, a shield for an inductor may be formed according to the present invention without such tab portions.

Figure 2G:
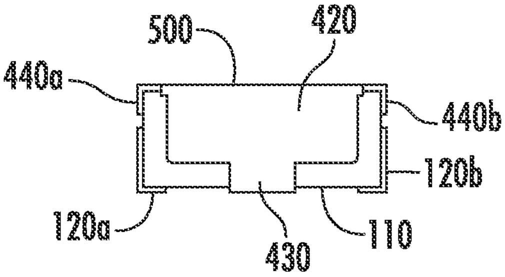
FIG. 2G shows a side plan view from the side of the inductor that does not include the leads of the shielded inductor of FIG. 2D.

FIG. 2G is an illustration of a front view of the example inductor 100, it being understood that the back view is a mirror image. As shown in FIG. 2G, the shield 500 is depicted at the top of the core body 115. The opposite first lead 120*a* and second lead 120*b* (which at the interior of the core body 115 extend from an inductor coil) are shown extending along opposite outer side surfaces of the inductor 100. The first lead 120*a* and second lead 120*b* are further partially bent underneath the inductor 100, and extend along a portion of the bottom surface 302, in order to form a surface mount device (SMD).

Figure 2H:
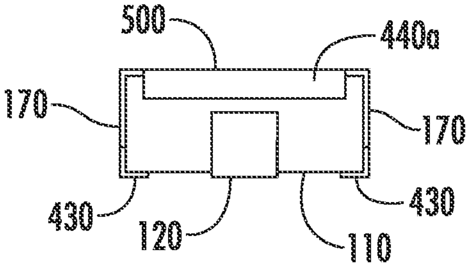
FIG. 2H shows a side plan view from the side of the inductor that does include the leads of the shielded inductor of FIG. 2D.
Figure 2I:
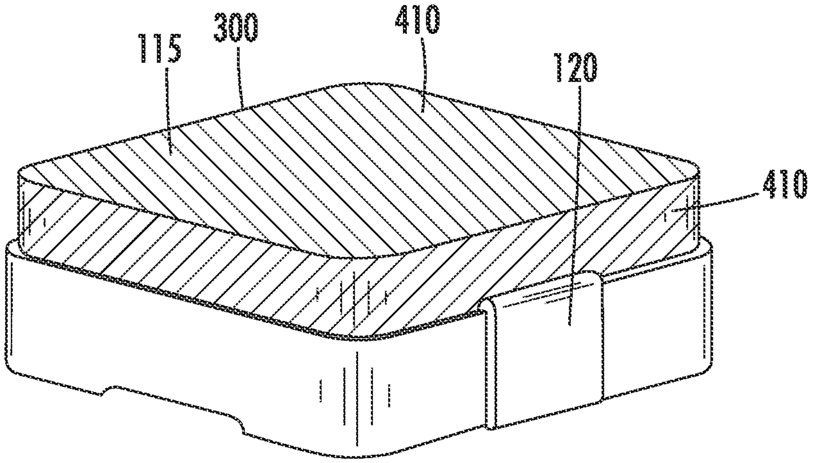
FIG. 2I shows a view of the inductor of FIG. 2A, with an insulating material coated to at least portions of the core body of the inductor.

FIG. 2H is an illustration of a right side view of the example inductor 100, it being understood that the opposite side is a mirror image. As shown in FIG. 2H the shield 500 covers the top surface 300 of the core body 115. The core body 115 is essentially centered in the depiction of inductor 100. The shield 500 includes side covers 440*a*, 440*b* that extend down the sides (to the left and right in FIG. 2H) of inductor 100 and include tab portions 430 bent to wrap underneath the bottom surface 302 of the core body 115, at least partially covering sections of the bottom surface 302 of the core body 115. The lip portions 440 partially extend down the sides (as shown in the front of FIG. 2D) of the core body 115.

Figure 3A:
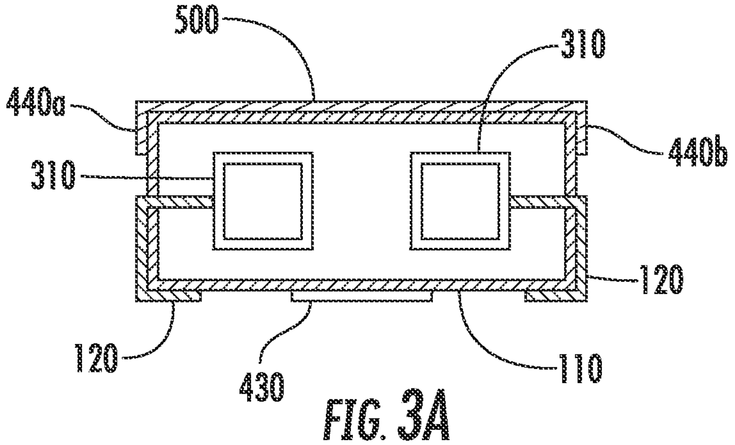
FIG. 3A shows a cross-sectional view of the shielded inductor of FIG. 2D taking along a line between the mid-points of the leads.

FIG. 3A is an illustration of a cross sectional front side view of the shielded inductor as shown in FIG. 2D, with the cross section at a midpoint between the two opposing side covers lip portions 440*a*, 440*b* and leads 120*a*, 120*b*. As shown in FIG. 3A, the shield 500 is positioned against a top surface 300 of the core body 115 with lip portions 440 extending the sides of core body 115. The leads 120 extend along the sides and under the core body 115. A coil 310 is contained within core body 115. As described above, coil 310 may be a wire coil (e.g., coil 24 in FIG. 10B) including an inner coil end and an outer coil end within the core body 115, the wire coil including a plurality of turns (e.g., turns 30 as shown in FIG. 10B) within the core body 115. The tab portions 430 wrap underneath core body 115, as previously described.

Figure 3B:
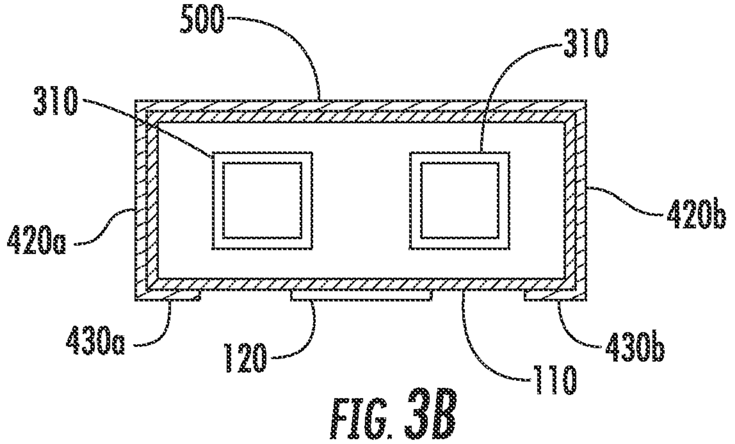
FIG. 3B shows a cross-sectional view of the shielded inductor of FIG. 2D taking along a line between the mid-points of the side covers of the shield.

FIG. 3B is an illustration of a cross sectional front side view of the shielded inductor as shown in FIG. 2D, with the cross section at a midpoint between the two opposing side covers 420*a*, 420*b*. As shown in FIG. 3B, the shield 500 is positioned against a top surface 300 of the core body 115 and extends down the side and under a bottom surface 302 of the core body 115. A portion of one of the leads 120 is shown in FIG. 3B bent under the core body 115, it being understood that a portion of the other lead 120 is bent under the core body 115 on an opposite side. The coil 310 is contained within the core body 115. The shield 500 includes side covers that extend down the sides of inductor 100 (to the left and right in FIG. 3B) and tab portions 430 that wrap underneath the bottom surface 302 of the inductor 100 at least partially covering sections of core body 115.

Figure 4:
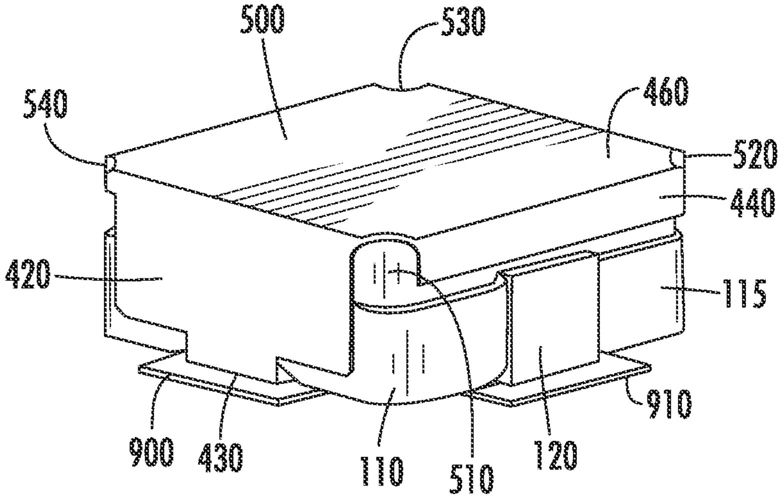
FIG. 4 shows the shielded inductor of FIG. 2D positioned with the leads and shield tabs in contact with solder pads, such as on a circuit board.

FIG. 4 shows the shielded inductor of FIG. 2D mounted and contacting a first set of solder pads 900 and a second set of solder pads 910. The first set of solder pads 900 provides electrical connectivity to the shield 500 via the tab portions 430, and may provide electrical grounding. The second set of solder pads 910 provides electrical connectivity to the leads 120.

Figure 5A:
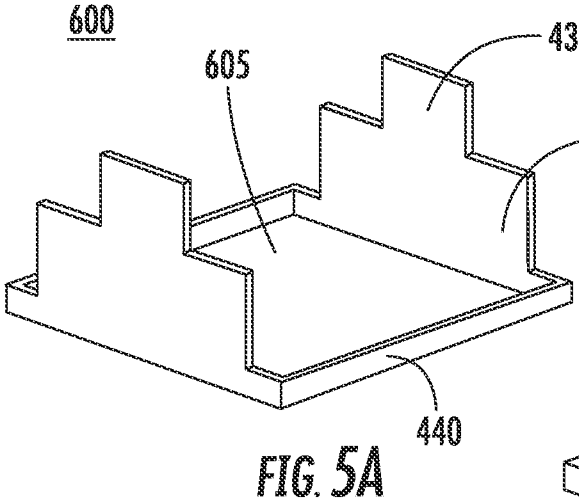
FIG. 5A shows a bottom perspective view of an embodiment of an inductor shield according to the present invention.
Figure 5B:
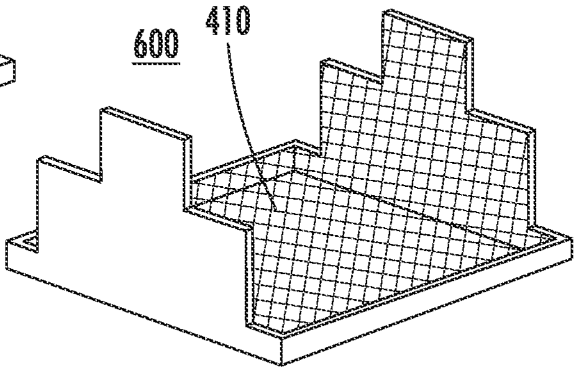
FIG. 5B shows the inductor shield of FIG. 5A with an insulation layer on an inner surface of the shield.

FIGS. 5A-5B show another embodiment of a shielded inductor according to the present invention. In this embodiment, rather than having cut-out edges as in the embodiments shown in FIGS. 2A through 2D, the shield 600 has a peripheral ridge that runs along the entire upper part of the shield 600, and includes meeting lip portions 440 and side cover portions 420. Accordingly, the shield 600 includes a plurality of enclosed corners 610, 620, 630, 640 at each edge of cover portion 460. In this way, the embodiment of FIGS. 5A-5B forms an enclosed lid 615 including cover portion 460 that would be made for a custom fit to the underlying core body 115 to which the shield 600 is attached. In other aspects, the shield 600 is similar to the shields previously discussed. Thus, the shield 600 has a a first side cover 420*a* and a second side cover 420*b* configured to shield the sides of core body 115 that do not have the leads 120. A first tab 430*a* and a second tab 430*a* extend from the side covers 420, with the tabs 430 designed so that during construction the tabs 430 may be bent around core body 115 and under core body 115 to hold shield 600 on the core body 115. The closed corners 610, 620, 630, 640 may enable tighter tolerances and fit for the shield 600 on the core body 115.

Figure 5C:
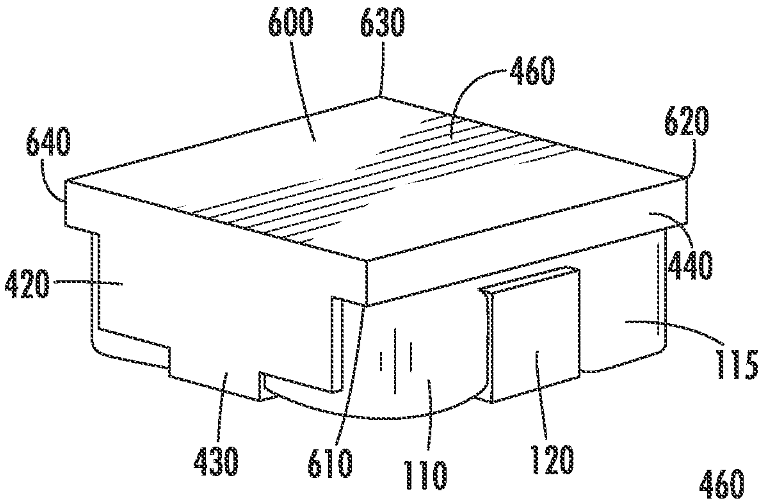
FIG. 5C shows the inductor shield of FIG. 5A or 5B positioned on the core body of an inductor to form a shielded inductor.
Figure 5D:
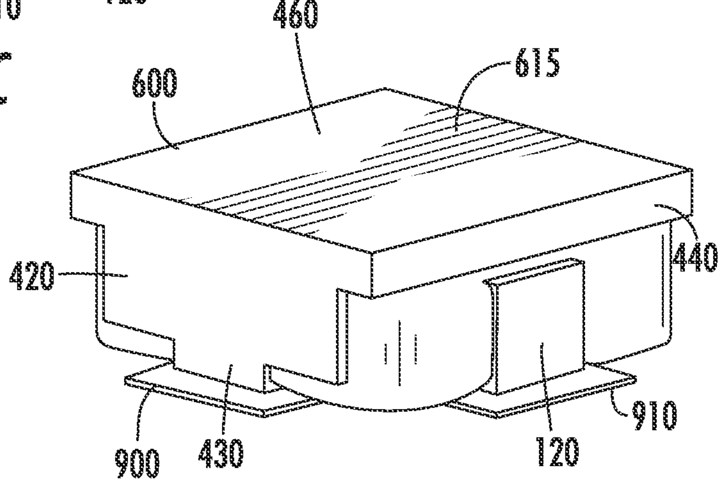
FIG. 5D shows the shielded inductor of FIG. 5B positioned with the leads and shield tabs in contact with solder pads, such as on a circuit board.

FIG. 5B shows the inner surface 605 of the shield 600 coated with an insulating layer 410 formed from an insulating material. It is appreciated that the insulating layer 410 could also be coated on at least portions of the core body prior to the shield 600 being attached to the core body. FIG. 5C shows the shield 600 of FIG. 5A or 5B mounted on the core body 115 of an inductor to form a shielded inductor. FIG. 5D shows the shielded inductor of FIG. 5C mounted and contacting a first set of solder pads 900 and a second set of solder pads 910. The first set of solder pads 900 provides electrical connectivity to the shield 600 via the tab portions 430, and may provide for grounding the shield. The second set of solder pads 910 provides electrical connectivity to the leads 120.

Figure 6A:
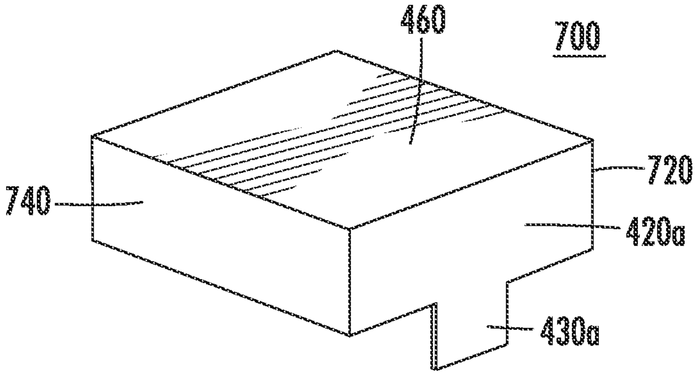
FIG. 6A shows a top perspective view of an embodiment of an inductor shield according to the present invention.
Figure 6B:
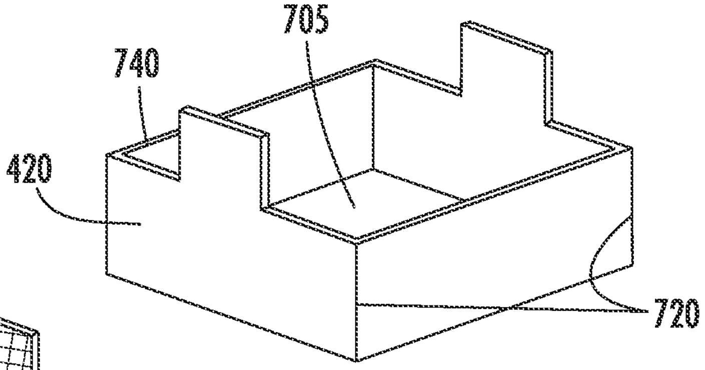
FIG. 6B shows a bottom perspective view of the inductor shield of FIG. 6A.
Figure 6C:
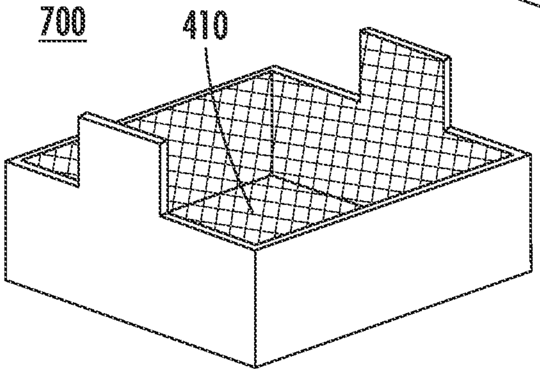
FIG. 6C shows the inductor shield of FIG. 6B with an insulation layer on an inner surface of the shield.
Figure 6D:
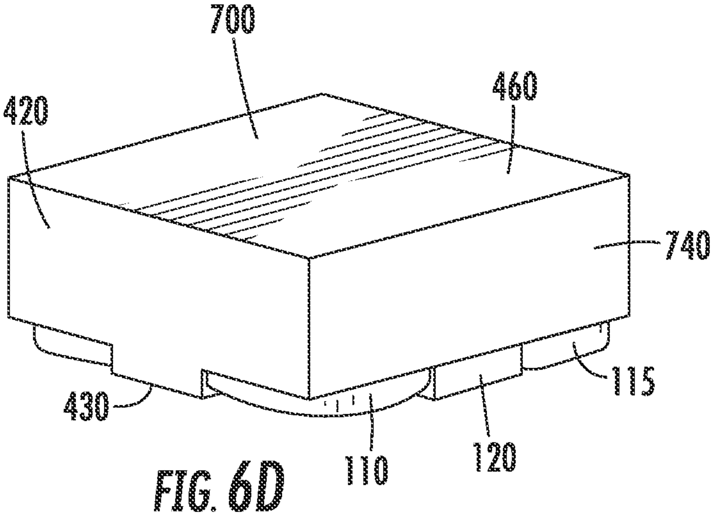
FIG. 6D shows the inductor shield of FIG. 6B or 6C positioned on the core body of an inductor to form a shielded inductor

FIGS. 6A-6B show another embodiment of a shielded inductor according to the present invention. In this embodiment, the shield 700 has side cover portions 420, 740 that are generally the same height, and are joined at the corners or edges 720, forming a "box-top" type of lid 715. Such a shield could be formed by drawing, such as with a flat sheet pressed into shape with an opening for receiving an inductor core body. As shown in the embodiment of FIG. 6, the side cover portions 740 cover the leads 120 of the inductor on the side of the core body, as compared to the cut-outs of the embodiment shown in, for example, FIG. 8 discussed below. FIG. 6C shows the inner surface 705 of the shield 700 coated with an optional insulating layer 410 formed from an insulating material. Alternately, an insulating layer may be formed on at least portions of the core body 115 before the shield 700 is positioned in place on the core body. FIG. 6D shows the shield 700 of FIG. 6B or 6C mounted on the core body 115 of an inductor to form a shielded inductor. As shown in FIG. 6D, The shield of FIGS. 6A-6D may need to be shaped to accommodate the size of the leads beneath the shield adjacent the lip portions 740.

Figure 7A:
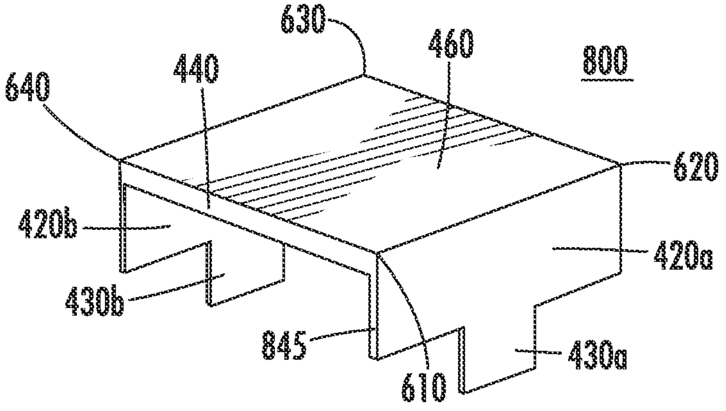
FIG. 7A shows a top perspective view of an embodiment of an inductor shield according to the present invention.
Figure 7B:
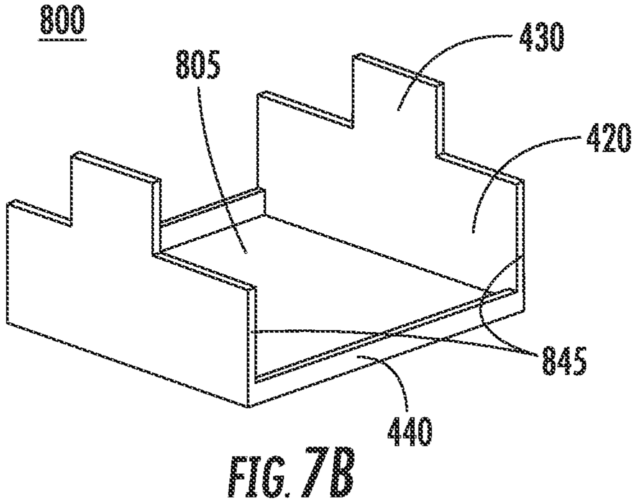
FIG. 7B shows a bottom perspective view of the inductor shield of FIG. 6A.
Figure 7C:
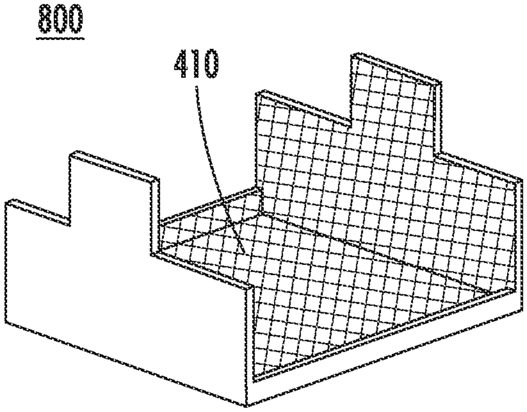
FIG. 7C shows the inductor shield of FIG. 6B with an insulation layer on an inner surface of the shield.

FIGS. 7A-7C show another embodiment of a shielded inductor according to the present invention. In this embodiment, the shield 800 has lip portions 440 that have a smaller height at their central portions, and downwardly extending narrow sidewalls 845 adjacent to and meeting the side cover portions 420 at the corners. This arrangement essentially frames the side of the core body 115 that includes the leads 120 with shielding. FIG. 7C shows the inner surface 805 of the shield 800 coated with an insulating layer 410. Alternately, an insulating layer may be formed on at least portions of the core body 115 before the shield 800 is positioned in place on the core body.

Figure 8:
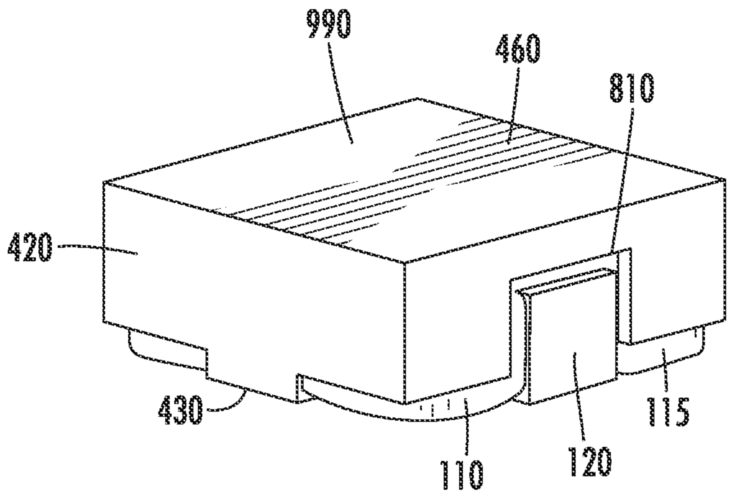
FIG. 8 shows an embodiment of an inductor shield positioned on the core body of an inductor to form a shielded inductor.

FIG. 8 shows another embodiment of a shield 990 positioned on a core body 115 to form a shielded inductor according to the present invention. The shield 990 is essentially similar to the shield of FIGS. 6A-6D, and further comprises a window or cut-out 810 around the leads 120, so that the leads are exposed, providing access to at least parts of the leads. It is appreciated that any of the shields of the invention described herein may provide a cut-out for the leads 120. The shielded inductor shown in FIG. 8 may have an insulating layer, as previously described, formed between at least a portion of the core body and at least a portion of the shield, such as directly applied to the core body, coated on an interior surface of the shield, or otherwise.

Figure 9:
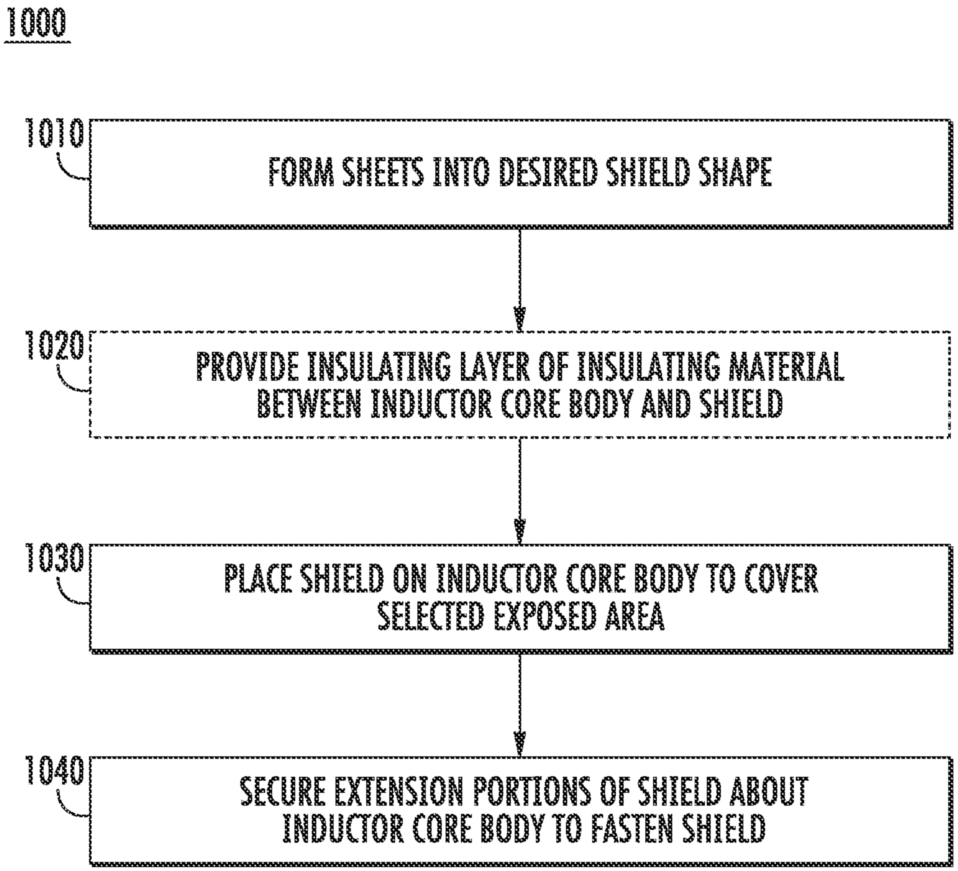
FIG. 9 illustrates a method making a shielded inductor according to the invention.

FIG. 9 is a flow diagram of a method 1000 of adding a shield to an inductor or to the core body of an inductor. The method 1000 includes producing an inductor, such as, by way of example, a high current, low profile inductor (IHLP) as identified in U.S. Pat. No. 6,204,744 and depicted in FIGS. 10A and 10B, although any inductor may be used, such as those shown in FIGS. 1A through 1I, or others known in the art. Generally, a method of forming a shielded inductor according to an embodiment of the invention may include pressure molding a magnetic material around a wire coil using pressure, heat and/or chemicals to form the core body 115, and to bond the wound coils to each other to form coil 310.

The core body of the inductor may be produced by a punch process, forming one or more pockets within the core body. The inductor may preferably be produced with a punch that produces four pockets in a powdered iron core. The purpose of the four pockets is to set the surface mount leads vertically higher (from top to bottom) in the inductor. Alternately, the inductor may be produced with no pockets.

The method 1000 further comprises producing a shield according to the invention by stamping and forming sheets in the shape that covers the body of the inductor in step 1010. The shield may be made having thin copper walls, or may be formed from another conductive material. It is appreciated that, for certain applications and shield shapes or designs, a shield, or parts of a shield, may be formed by drawing a conductive metal sheet to form a selected shield shape.

An adhesive layer of an insulating material may optionally be positioned between the core body of the inductor and the shield, as shown in step 1020. In an embodiment, process may comprise applying a thin insulating layer of insulating material, such as KAPTON™, TEFLON™, formed on an inner surface of the shield to electrically isolate the shield from the core of the inductor at step 1020. The inner surface of the shield covered including an insulating layer of insulating material is generally the side of the shield that is placed proximate to the inductor once assembled, although benefits may be realized by placing insulating material on any portion of the shield. Alternately, the process may include applying an insulating layer directly to at least portions of the surface of the core body. In a further variation, an insulating tape may be positioned between parts of the core body and parts of the shield.

The method 1000 further comprises placing the shield on the pressed powder inductor core body in order to cover selected areas of the outer surface of the inductor core body, at step 1030.

Once the shield is positioned, the method 1000 may further comprise forming portions of the shield, such as the extensions (tabs and/or side cover portions), around the sides and/or bottom surface of the inductor core body to fasten the shield to the inductor core body at step 1040.

The addition of the shield as described herein, which may be electrically grounded, combines a shield and an inductor into one package, with the shield covering at least a part of the outer surface of the core body of the inductor. The shielded inductor of the invention reduces the space required inside an electronic device to shield an inductor and reduces interference from electromagnetic radiation or other electric or magnetic field interference at the source. The shield provides a simpler and typically more cost effective solution to a prior problem.

While variously shaped and sized shields are disclosed, the shield may be sized and shaped to cover any desired part of the outer surface of the core body of an inductor. Thus, while shielded inductors according to the present invention are shown herein covering parts of the top, sides and bottom of a core body of an inductor, an inductor shield according to the invention could be formed to cover only select surfaces of a core body. For example, an inductor shield may cover less than the total area of the top surface, may have no side cover portions or tabs, or may only have one side cover extension extended down part of one side of the core body or one tab extending beneath the core body. Thus, the size and coverage area of the shield may be varied depending on the use or specifications for a particular shielded inductor. Different applications and conditions may require more or less of any area to be covered by the shield.

It is further appreciated that the core body may be formed having indentations or channels to accommodate one or more portions of the shield. Thus, one or more parts of the shield could be positioned within recessed areas along the outer surface of the core body.

The addition of insulating material between the shield and the inductor greatly increases the maximum operating voltage of the shielded inductor. A shielded inductor according to the invention shows more than a 50% drop in magnetic radiation field strength and the size of the field compared to an unshielded inductor having a similar design. A shielded inductor according to the invention is able to withstand a DC dielectric voltage of 200 V.

The present shielded inductor may be used in electronics applications where electromagnetic field disturbance in circuits is a concern and electronics applications where shock and vibration are concerns. The present shielded inductor may be used in electronics where electromagnetic field emissions have the potential to disturb and/or decrease performance of the device and electronics applications where improved shock and vibration resistance is required. A shield for use with an inductor according to the invention both shields electrical components from fields generated by the inductor, and further shields the inductor from fields generated by adjacent electrical components.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A method of forming an electro-magnetic device for mounting on a circuit board, the method comprising:

forming a coil;

pressure molding a magnetic core body around the coil, the magnetic core body having a top surface and a bottom surface opposite the top surface, wherein the magnetic core body is formed so as to completely surround at least a portion of the coil;

providing a first lead and a second lead connected to the coil, wherein a portion of the first lead and a portion of the second lead each extend along the magnetic core body;

positioning a shield comprising a conductive material on the magnetic core body, wherein the shield covers at least a portion of the top surface of the magnetic core body including a central area of the top surface of the magnetic core body; and providing an insulating material or an adhesive between a surface of the shield facing the magnetic core body and the magnetic core body when the shield is positioned on the magnetic core body.

2. The method of claim 1, wherein the shield is formed comprising a conductive path, the conductive path extending along at least a portion of the top surface of the magnetic core body and at least a portion of a first side of the magnetic core body.

3. The method of claim 2, wherein the conductive path extends along at least a portion of a second side of the magnetic core body.

4. The method of claim 2, wherein the conductive path extends along at least a portion of a bottom surface of the magnetic core body.

5. The method of claim 1, wherein the shield comprises a top cover portion covering at least a portion of the top surface of the magnetic core body, a first side cover portion extending from a first side of the top cover portion and along a first side of the magnetic core body, a second side cover portion extending from a second side of the top cover portion and along a second side of the magnetic core body, a third extension extending from a third side of the top cover portion and along a third side of the magnetic core body, and a fourth extension extending from a fourth side of the top cover portion and along a fourth side of the magnetic core body.

6. The method of claim 5, wherein the first side cover has a length different than a length of a portion of the third extension, and wherein the second side cover has a length different than a length of a portion of the fourth extension.

7. The method of claim 5, wherein a gap is provided in the shield between the first side cover and the third extension, wherein a gap is provided in the shield between the first side cover and the fourth extension, wherein a gap is provided in the shield between the second side cover and the third extension, and wherein a gap is provided in the shield between the second side cover and the fourth extension.

8. The method of claim 5, wherein a no gap is provided in the shield between the first side cover, the second side cover, the third extension, and the fourth extension.

9. The method of claim 1, further comprising extending at least a portion of the first lead along a side of the magnetic core body and at least a portion of a bottom surface of the magnetic core body, and further comprising extending at least a portion of the second lead along the same side or another side of the magnetic core body and at least a portion of the bottom surface of the magnetic core body.

10. The method of claim 1, wherein the insulating material or the adhesive comprises an insulating material.

11. The method of claim 1, wherein the insulating material or the adhesive is positioned between an entirety of the surface of the shield facing the magnetic core body when the shield is positioned on the magnetic core body.

12. The method of claim 1, wherein the insulating material or the adhesive is provided as a coating on the surface of the shield facing the magnetic core body when the shield is positioned on the magnetic core body.

13. The method of claim 1, wherein the insulating material or the adhesive is applied to at least a part of an outer surface of the magnetic core body.

14. The method of claim 1, wherein the insulating material or the adhesive comprises the insulating material, and wherein the insulating material is formed from a material different than the conductive material of the shield and different than material forming the magnetic core body.

15. The method of claim 1, wherein the insulating material or the adhesive is formed separately from the magnetic core body, or separately from the shield, or both.

16. The method of claim 1, wherein at least a portion of the first lead and at least a portion of the second lead extend along at least a portion of the bottom surface of the magnetic core body.

17. The method of claim 1, wherein the shield covers a majority of the top surface of the magnetic core body.

* * * * *